Feb. 28, 1928.
J. P. MADDEN ET AL
1,661,000
TANK CAR
Filed Feb. 18, 1924     5 Sheets-Sheet 1
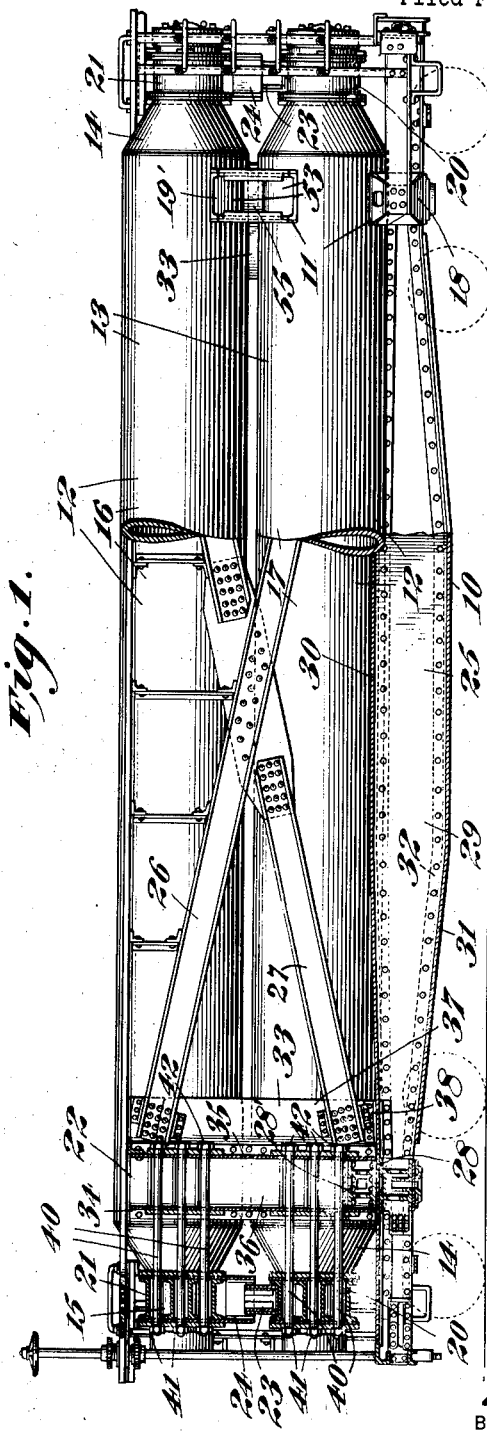
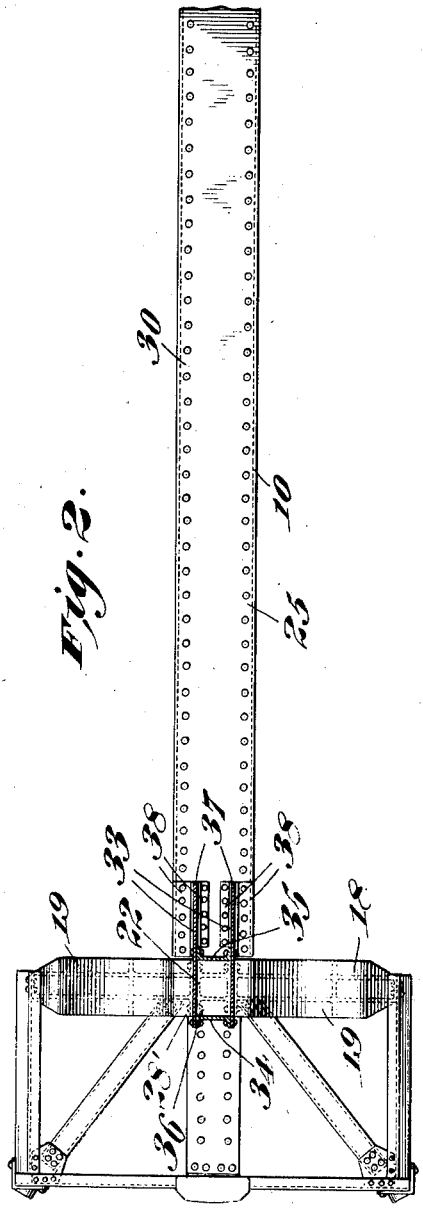
INVENTORS
James P. Madden
and Ralph E. Wilder.
BY
A. B. Reavis
ATTORNEY

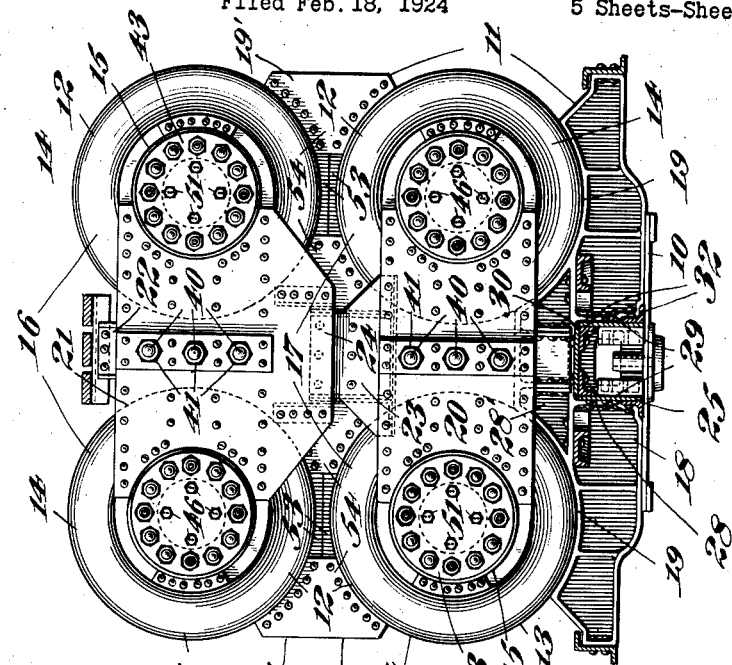

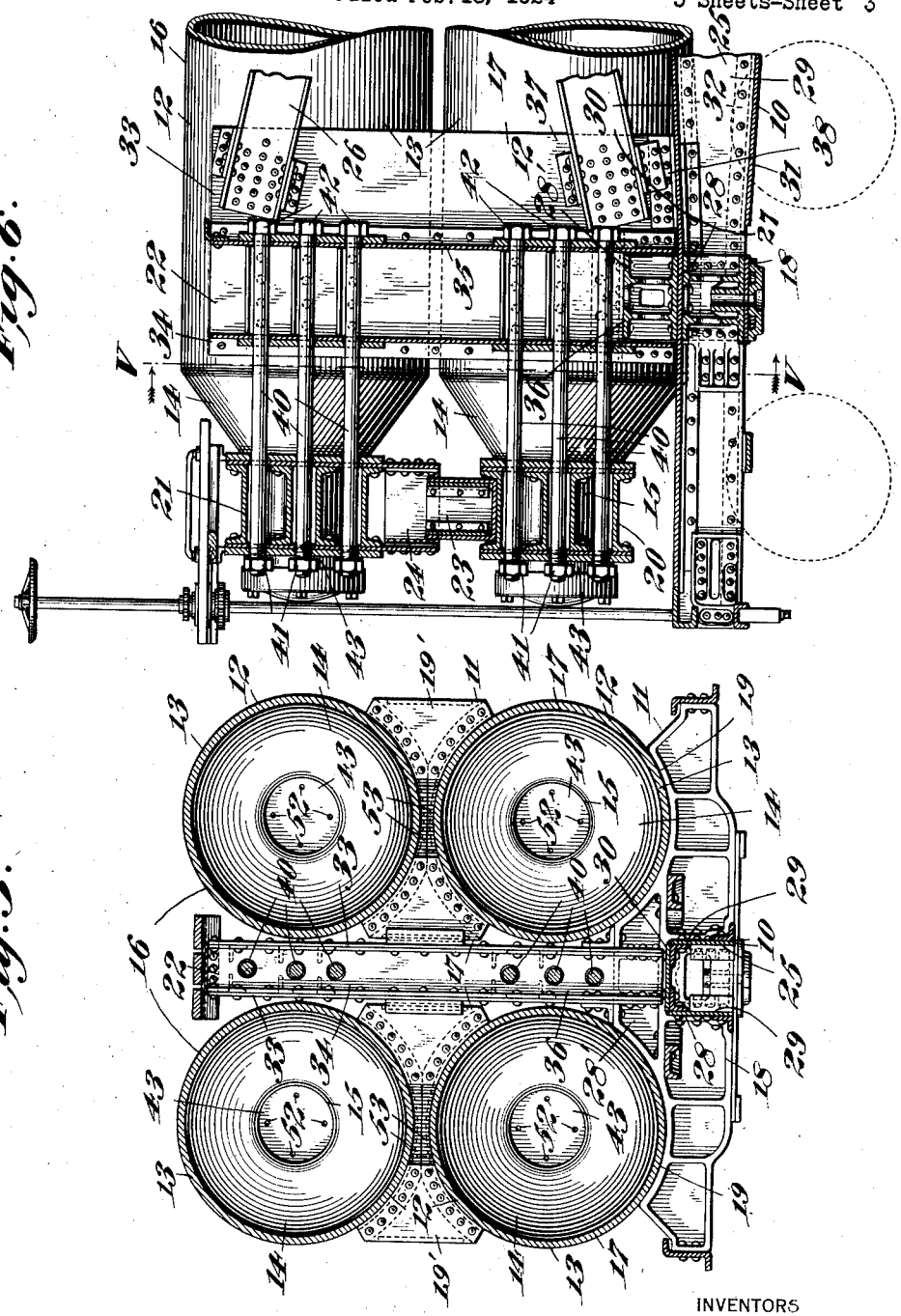

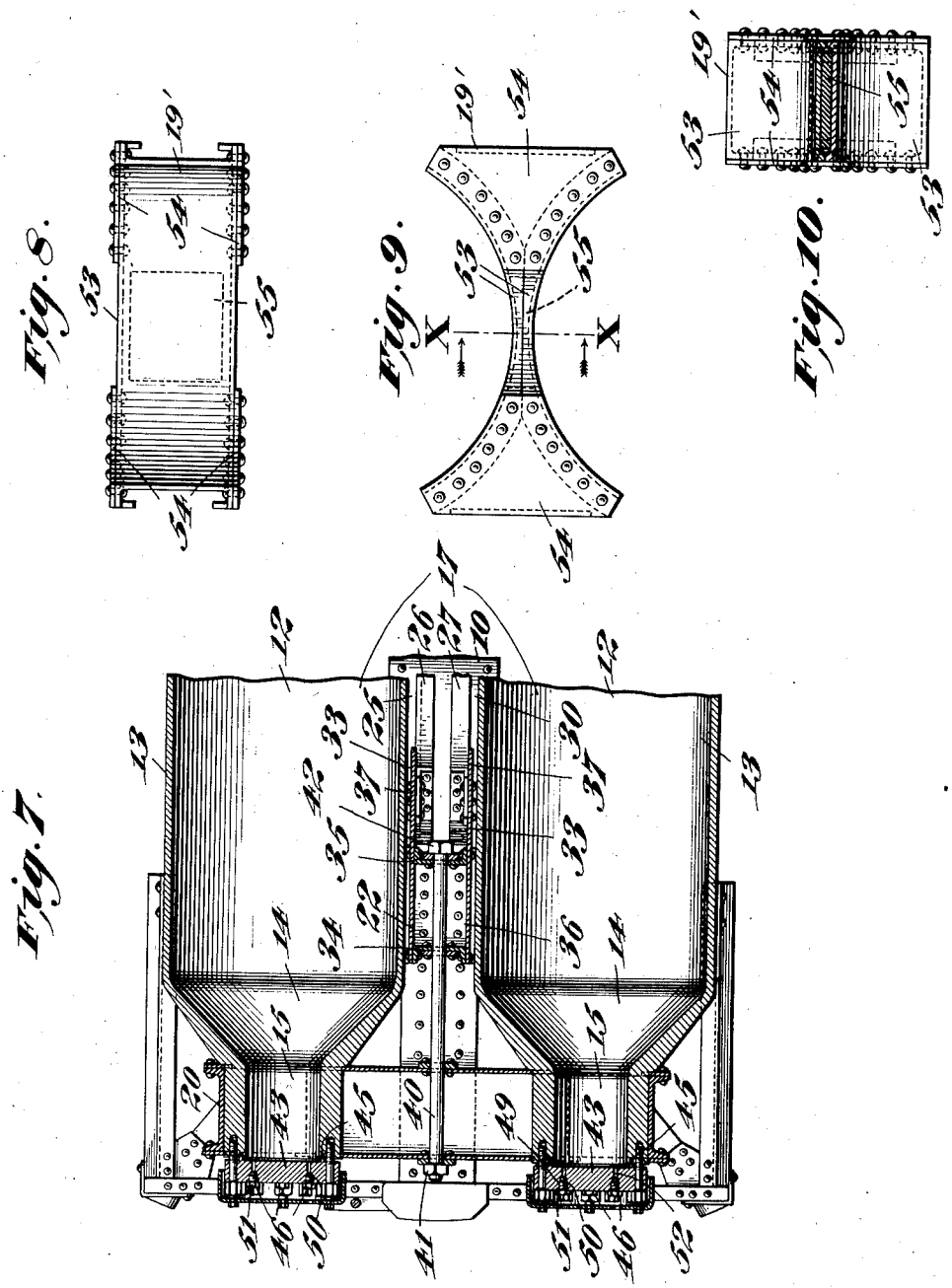

Feb. 28, 1928.
J. P. MADDEN ET AL
1,661,000
TANK CAR
Filed Feb. 18, 1924
5 Sheets-Sheet 5
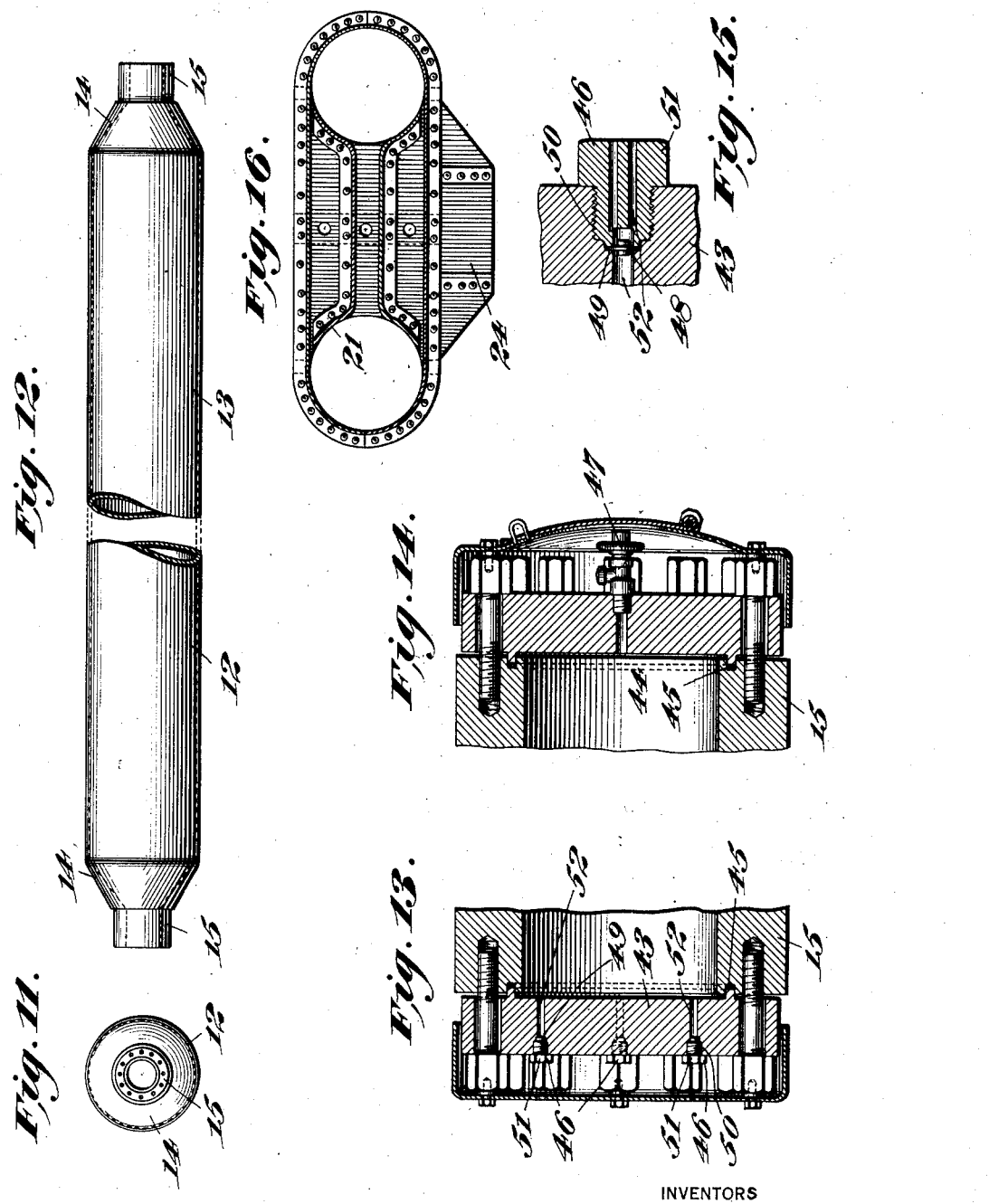
INVENTORS
James P. Madden
and
BY Ralph E. Wilder.
A. B. Reavis
ATTORNEY Patented Feb. 28, 1928.

1,661,000

UNITED STATES PATENT OFFICE.

JAMES P. MADDEN AND RALPH E. WILDER, OF BETHLEHEM, PENNSYLVANIA, ASSIGNORS TO BETHLEHEM STEEL COMPANY.

TANK CAR.

Application filed February 18, 1924. Serial No. 693,601.

Our invention relates to tank cars and tanks suitable for the transportation of fluids under pressure. To transport gases economically in this manner, it is desirable to reduce the volume as much as practicable; and high pressures, therefore, necessarily exist in the tank or tanks. For example, the pressure may be about 2000 or 2500 pounds per square inch. To withstand the high pressures, we provide tanks of relatively small diameter compared to their lengths. Furthermore, each of our improved tanks is an integral forging, thereby providing a structure which is very strong, as it is entirely seamless and one which permits of the best metallurgical treatments conducive to strength. While, from the standpoint of design and manufacture, a material capable of withstanding high internal stresses results and while such stresses are kept relatively lower for a given internal pressure by providing long tanks of smaller diameter than ordinarily employed, the strength of such tanks is further conserved by a special type of car construction, whereby none of the stresses incident to movement of the car are transmitted to the tanks. Our invention, therefore, has for an object to provide, for tanks of this character, car structure which is suitably strong and which is capable of so supporting the tanks that the latter are not subjected to stresses imposed on such structure.

A further object of our invention is to provide a car having a longitudinally rigid structure to resist stresses incident to movement of the car and supporting means for the tanks so related to the car that transmission of stresses to the tank or tanks incident to movement of the car are avoided.

These and other objects are accomplished by our invention as will be apparent from a consideration of the drawings, the following description, and the appended claims.
Apparatus made in accordance with our invention is illustrated in the accompanying drawings, forming a part of our application, in which:

Figure 1 is a view partly in side elevation and partly in section showing our improved tank car construction;

Figure 2 is a detail view showing one of the body bolsters and a portion of the center sill structure;

Figure 3 is an end elevation of our improved car structure;

Figure 4 is a view similar to Fig. 3 and with certain parts removed and with the lower center sill structure shown in section;

Figure 5 is a section along the line V—V of Fig. 6;

Figure 6 is a section along the line VI—VI of Fig. 3;

Figure 7 is a detail horizontal sectional view taken along the line VII—VII of Fig. 3;

Figures 8, 9 and 10 are detail views of a spacer structure for interposition between upper and lower tanks, Fig. 10 being a sectional view along the line X—X of Fig. 9;

Figures 11 and 12 are end and side elevations, respectively, of our improved tank;

Figures 13 and 14 are detail sectional views of closures for the tank ends, sections of the tank being in elevation;

Figure 15 is a detail view of a safety valve structure; and,

Figure 16 is a detail view of an upper yoke member.

Referring to the accompanying drawings for a better understanding of our invention, we show a car having a bottom structure, at 10, which supports two-point suspension devices, at 11, adjacent to each end of the car; the suspension devices supporting the ends of tanks 12. The bottom structure, at 10, is made sufficiently strong to resist draw stresses of the car, whereby such stresses are prevented from transmission to the tanks 12. Also, the two-point suspension for each tank assures that the car may adjust itself to the track without imposing stresses on the tanks.

The tanks shown in Figs. 11 and 12, each consist of a cylindrical portion 13, tapering end portions 14, and neck portions 15. We preferably have four tanks on a car, an upper pair, at 16, and a lower pair, at 17. Each tank has a two-point support with respect to the car and they are supported by structure which will now be described.

The two-point support for the tanks of the lower pair 17 is composed of body bolsters 18 having saddle portions or seats 19 for the tanks. The tanks of the upper pair 16 are sustained by the tanks of the lower pair through the intermediary of spacing members 19' fitting the contours of the tanks.

The tanks are held in place longitudinally of the car by upper and lower yoke members 20 and 21, which engage around the neck portions 15 of the tanks, the yoke members being connected to column structures 22 near each end of the car. Each upper yoke member 21 has a vertical slip joint connection comprised by a vertical boss 23 carried by a lower yoke member fitting a socket 24 in an upper yoke member. The slip joint permits of the necessary vertical adjustment in assembly and it serves to transmit lateral thrusts of the upper pair of tanks to the lower tanks and from the latter to the saddle portions of the bolsters.

To the end of providing a rigid car structure which shall absorb draw stresses without transmitting the latter to or through the tanks, we provide a strong built-up center sill 25 which is connected to intermediate portions of the body bolsters. The column structures 22 are secured to the body bolsters at intermediate portions of the latter and to the center sill, the column structures being braced in a direction longitudinal of the car by the members 26 and 27. Not only do the column structures 22 provide supports which are rigid longitudinally of the car and to which terminal portions of the tanks are connected in the manner already set forth, but also such columns serve, as hereinafter pointed out, to brace the bolsters with respect to the center sill.

The bolsters, in addition to the saddle portions 19, have lower openings 28 which fit around the box-like structure of the center sill 25 and at their upper sides, between the saddle portions, they are provided with upwardly-extending projections 28' for a purpose to be described.

The center sill is comprised by side plates 29, a top plate 30 and a bottom plate 31 connected by angles 32 riveted thereto.

Each column structure 22 is comprised by relatively wide plates 33 connected by channels 34 and 35, the channel 34 being secured to the plates 33 at one side of the latter and the other channel 35 being connected to intermediate portions of the plates, thereby defining column portions 36 which fit over the bolster projections 28' aforesaid and are riveted thereto. The portions 37 of the plates projecting beyond the channels 35 are connected to the center sill top plate 30 by angles 38 riveted both to the plate portions and to the top plate. The hereinbefore mentioned diagonal members 26 and 27 are riveted to the inwardly-projecting plate portions 37.

The yoke members 20 and 21 are connected medially to the column structures 22 by means of vertical series of rods 40, which pass through openings in the yoke members and through openings in the channel members 34 and 35 of the column structures 22. As shown, the tanks 12 are longer than the distance between outer sides of the column structures 22 so that the rods 40 project outwardly from the column structures. The nuts 41 on the rods are preferably adjusted so as to provide for play between the heads 42 and nuts and the yoke and column structures and the openings for the rods are preferably larger than the rods, all for purposes hereinafter stated. In operation, the inertia of the tanks 12, due to changes in car velocity, is taken up in tension in the rods 40.

Each tank is provided with covers 43 and 44 for the ends, the covers having packed annular tongue-and-groove joints 45 with respect to the tanks to obtain a good gastight fit. The cover 43 is provided with pressure safety devices 46 and the cover 44 is provided with a valve 47, whereby a tank may be filled and emptied.

The safety devices comprise preferably shearable disk members 48 adapted to fit against shoulders 49 of counter-sunk openings 50 in the cover 43, the disks being clamped against the shoulders by threaded follower members or plugs 51. The plugs 51 and covers 43 have channels 52 therein to permit gas to escape when the disk members are sheared incident to over-pressure. In this way, the tanks are protected against possible rupture.

The spacing members 19' are preferably comprised by curved channel portions 53 which are connected by side plates 54, as shown in Figs. 8, 9 and 10, a spacing block 55 being preferably arranged between the channel members to give the spacing member strength in compression.

The tanks are preferably made from ingots which are bored, forged, machined, and given the proper heat treatment in order to produce a unitary seamless tank capable of withstanding high pressures.

From the structure described, it will be apparent that we have provided a car structure which is relatively rigid in a longitudinal direction, such structure consisting primarily of a center sill 25 having its terminal portions secured to intermediate portions of the end or body bolsters 18. The bolsters are provided, at either side of the center sill 25, with saddles or seats 19 for tanks which are arranged to span the space between the bolsters and to extend therebeyond. The car structures is reinforced in a longitudinal direction by the columns 22 and the diagonal braces 26 and 27, although these column members and the braces function primarily as upright structure to which the terminal portions of the tank are secured. This type of car structure is, therefore, quite rigid in a longitudinal direction, whereby longitudinal stresses imposed upon the car in service are absorbed and are not transmitted to the tanks, while, at the same time, such structure is capable of weaving or twisting to accommodate itself to a track; and, since each of the tanks is supported only at two points and since the tanks are flexibly connected transversely to the car structure, the tanks are readily accommodated to such structure, even though the latter weaves or twists slightly in accommodating itself to a track, without, on that account, having stresses imposed thereon.

The tanks 12 span or bridge the space between and are supported by the bolsters, and the upper tanks being supported by the lower tanks. Lateral forces on the upper pair of tanks, at 16, are transmitted therefrom through the yoke members 21, from the latter by the joint members 24 and 23 to the lower yoke 20, and from the lower yoke 20 through the lower pair of tanks, at 17, to the bolsters 18. The mounting of the rods 40 with respect to column structures 22 and the yoke members 20 and 21, as well as the inherent flexibility of such rods, permits of the car weaving or yielding transversely without transmitting any transverse stresses due thereto to the tanks. Inertia of the tanks incident to velocity of a car is taken up in tension by the rods 40. Hence, we have provided a tank car which is so constructed that the tanks are subjected only to forces due to the gas pressure, to the inertia thereof, and to their weight, all other forces being either absorbed by the car structure or not being transmitted to the tanks owing to the capability of relative adjustment or accommodation of the tanks with respect to the car structure as already pointed out.

While we have shown our invention in but one form, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

Having thus described the invention what we claim as new and desire to secure by Letters Patent is:

1. In a tank car, the combination of tank supporting members extending transversely of the car, tanks disposed longitudinally of the car and carried by the supporting members, a rigid construction disposed centrally and longitudinally of the car and connected to central portions of the supporting members, and means connected to said construction and cooperating with end portions of the tanks for holding the latter in place relatively to the car.

2. In a tank car, the combination of a center sill, body bolsters having their intermediate portions rigidly connected to terminal portions of the center sill and each having concave, tank-supporting portions at each side of the center sill, and a plurality of tanks spanning the space between bolsters and fitting said concave supporting portions.

3. In a tank car, the combination of body bolsters, single means for connecting the body bolsters consisting of a center sill, and tanks supported on the bolsters at each side of the center sill and spanning the space between bolsters.

4. In a tank car, the combination of body bolsters, single means for connecting the bolsters consisting of a center sill, superposed tanks supported by the bolsters with the lower tanks thereof resting on the bolsters at either side of the center sill and all of said tanks spanning the space between bolsters.

5. In a tank car, the combination of a pair of bolsters, longitudinally rigid car structure connected to the bolsters, a plurality of tanks supported by the bolsters, yokes connected to the ends of the tanks, said yokes being spaced from the rigid structure, and rods for connecting the yokes to said structure.

6. In a tank car, the combination of bolsters, a longitudinally rigid structure connected to the bolsters, a plurality of tanks supported by the bolsters, each of said tanks being reduced at its ends to provide necks, yoke members surrounding the necks, and rods for connecting the yoke members to said rigid structure.

7. In a tank car, the combination of bolsters, a vertically-disposed structure extending longitudinally of the car and connected to intermediate points of the bolsters, said structure being braced longitudinally, a plurality of tanks supported by the bolsters, and means for connecting the ends of the tanks to the structure.

8. In a tank car, the combination of bolsters, a vertically-disposed structure extending longitudinally of the car and connected to intermediate points of the bolsters, said structure being braced longitudinally, a plurality of tanks supported by the bolsters, and means capable of lateral deflection for connecting the ends of the tanks to said structure.

9. In a tank car, the combination of bolsters, a vertically-disposed structure extending longitudinally of the car and connected to intermediate points of the bolsters, said structure being braced longitudinally, a plurality of tanks of greater length than the structure and supported by the bolsters, yokes connnected to the tank ends, and rods for connecting the yokes to said structure.

10. In a tank car, the combination of bolsters, a vertically-disposed structure extending longitudinally of the car and connected to intermediate points of the bolsters, said structure being braced longitudinally, tanks supported by the bolsters at opposite sides of said structure, yokes connected to pairs of tanks at the ends thereof, and means for connecting the yokes to said structure.

11. In a tank car, the combination of bolsters, an upwardly-extending structure arranged longitudinally of the car and connected to intermediate points of the bolsters, said structure being braced longitudinally, a plurality of pairs of tanks supported by the bolsters, each pair of tanks consisting of tanks on opposite sides of said structure, yokes connected to the ends of pairs of tanks at each end of the latter, means for connecting the yokes to said structure, and means for connecting an upper yoke to a lower yoke to resist lateral displacement of the former with respect to the latter.

12. In a tank car, the combination of bolsters, a structure rigid longitudinally of the car and connected to intermediate points of the bolsters, a plurality of pairs of tanks supported by the bolsters, each pair of tanks consisting of tanks on opposite sides of said structure, yokes connected to ends of pairs of tanks at each end of the latter, rods for connecting the yokes to said structure, and means for connecting an upper yoke to a lower yoke to resist lateral displacement of the former with respect to the latter.

13. In a tank car, the combination of bolsters, a structure rigid longitudinally of the car and connected to intermediate points of the bolsters, a plurality of pairs of tanks supported by the bolsters, each pair of tanks consisting of tanks on opposite sides of said structure, spacing members between upper and lower superposed tanks, yokes connected to ends of pairs of tanks at each end of the latter, means for connecting the yokes to said structure, and means for connecting an upper yoke to a lower yoke to resist lateral displacement of the former with respect to the latter.

14. In a railway tank car, the combination of bolsters, a structure rigid longitudinally of the car and connected to intermediate points of the bolsters, a plurality of superposed tanks at each side of the structure, said bolsters having concave seats to receive the bottom tanks, separators for interposition between superposed tanks having downwardly directed concave seats to fit the top of a lower tank and upwardly directed concave seats to fit the bottom of an upper tank, and means for connecting the ends of the tanks to said structure.

15. In a railway tank car, the combination of bolsters, a structure rigid longitudinally of the car and connected to intermediate points of the bolsters, a plurality of superposed tanks at each side of the structure, said bolsters having concave seats to receive the bottom tanks, separators between upper and lower superposed tanks, yokes connected to the ends of the tanks, and longitudinally rigid and laterally deflectable means for connecting the yokes to said structure.

16. In a railway tank car, the combination of bolsters, a structure rigid longitudinally of the car and connected to intermediate points of the bolsters, a plurality of superposed tanks at each side of the structure, said bolsters having concave seats to receive the bottom tanks, separators for the superposed tanks having seats to fit the top of a lower tank and the bottom of an upper tank, yokes for connecting the ends of the lower tanks, yokes for connecting the ends of upper tanks, means for resisting relative displacement of the yokes at each end of the car, and means for connecting the yokes to said structure.

17. In a railway tank car, the combination of bolsters, a structure rigid longitudinally of the car and connected to intermediate points of the bolsters, a plurality of tanks extending longitudinally of the car and supported by the bolsters, each of said tanks being reduced at its ends to provide neck portions, yokes fitting about said neck portions, and means for connecting the yokes to said structure.

18. In a railway tank car, the combination of bolsters, a structure rigid longitudinally of the car and connected to intermediate points of the bolsters, a plurality of tanks extending longitudinally of the car and supported by the bolsters, said tanks each being longer than said structure and each being reduced at its ends to provide neck portions, yoke members fitting about the neck portions, and longitudinally rigid but laterally deflectable means for connecting the yokes to said structure.

19. In a railway tank car, the combination of bolsters, a structure rigid longitudinally of the car and connected to intermediate points of the bolsters, a plurality of tanks supported by the bolsters, said tanks being longer than said structure and having their ends reduced to provide neck portions, yoke members fitting about the neck portions, and rods for connecting the yoke members to said structure.

20. In a railway tank car, the combination of bolsters, a structure rigid longitudinally of the car and connected to intermediate points of the bolsters, a plurality of tanks supported by the bolsters, each of said tanks being reduced at its ends to provide neck portions, yoke members extending transversely of the car for fitting neck portions of tanks at opposite sides of said structure, and rods for connecting the yoke members to said structure.

21. In a railway tank car, the combination of a pair of bolsters, a center sill connected to the bolsters, column members connected to the bolsters and to the center sill, a plurality of tanks extending longitudinally of the car, supported by the bolsters, and disposed on opposite sides of the column members, and means for connecting the ends of the tanks to the column members.

22. In a railway tank car, the combination of a pair of bolsters, a center sill connected to the bolsters, column members connected to the bolsters and extending upwardly therefrom, means for bracing the column members longitudinally of the car, tanks supported by the bolsters and disposed on opposite sides of the column members, and means for connecting the ends of the tanks to the column members.

23. In a railway tank car, the combination of a pair of bolsters, a center sill connected to the bolsters, centrally disposed column members extending above the bolsters, tanks supported by the bolsters and arranged on opposite sides of the column members, each of said tanks being reduced at its ends to provide neck portions, yokes secured to the neck portions, and longitudinally rigid and laterally deflectable means for connecting the yokes to the column members.

24. In a railway tank car, the combination of a pair of bolsters, a center sill connected to the bolsters, column members having relatively wide web portions extending longitudinally of the car and connected to the bolsters and to the center sill, means for bracing the column members longitudinally of the car, said bolsters having tank saddles at opposite sides of said column members, a plurality of tanks seated in said saddles, tanks arranged above the first tanks, separators between the tanks and having seats to fit the contours thereof, each of said tanks being reduced at its ends to provide neck portions, transverse yoke members secured to neck portions of tanks on opposite sides of said column members, means to resist relative displacement of upper and lower yoke members, and rods for connecting the yoke members to the column members.

25. In a railway tank car, the combination of a pair of bolsters, a center sill connected to the bolsters, a column structure connected to a bolster and to the center sill at each end of the car, the column structure consisting of relatively wide lateral plates spaced and connected by relatively narrower plates, the wide plates extending longitudinally of the car, said bolsters having concave seats at opposite sides of said column structures, tanks fitting in said seats, each of the tanks being reduced at its ends to provide neck portions, yoke members secured to the neck portions of tanks at opposite sides of said column structures, rods passing through the yoke members and through the narrower plate members of said column structures, and nuts fitting the ends of said rod members, whereby the tanks may be connected with respect to the column members.

26. In a railway tank car, the combination of a pair of bolsters, a center sill connected to the bolsters, column structures secured to the bolsters and to the center sills, each of said column structures consisting of relatively wide plate members disposed longitudinally of the car and relatively narrower transverse plate members connecting the wide plate members, cross braces connected to the wide plate members of the column structures at each end of the car, said bolsters having concave seats at opposite sides of the column structures, tanks fitting the seats, tanks arranged above the first tanks, separators between superposed tanks and having seats to fit the contours of the latter, each of said tanks being reduced at its ends to provide neck portions, transverse yoke members fitting the neck portions of pairs of tanks arranged at opposite sides of said column structures, means for preventing relative lateral displacement of an upper yoke member with respect to a lower yoke member, and rods extending through the yoke members and through the narrower plate members of said column structures, whereby inertia of the tanks due to change in car velocity is transmitted to and through the yokes and from the latter through the rods to the column structures.

27. In a tank car construction, the combination of a pair of body bolsters, a pair of lower tanks extending longitudinally of the car construction and resting on the body bolsters, an upper tank extending longitudinally of the car construction, cradle devices arranged between the upper tank and the lower tanks and disposed vertically above the bolsters, and means for holding the lower tanks in place with respect to the bolsters and for holding the upper tank in place with respect to the cradle devices.

In testimony whereof we hereunto affix our signatures this 16th day of February, 1924.

JAMES P. MADDEN.
RALPH E. WILDER.